United States Patent
Presby et al.

(10) Patent No.: US 6,240,226 B1
(45) Date of Patent: May 29, 2001

(54) POLYMER MATERIAL AND METHOD FOR OPTICAL SWITCHING AND MODULATION

(75) Inventors: Herman M. Presby, Highland Park; Dietrich Marcuse, Lincroft, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/133,459

(22) Filed: Aug. 13, 1998

(51) Int. Cl.[7] .................. G02B 6/26; G02B 1/035
(52) U.S. Cl. .................. 385/42; 385/3; 385/145
(58) Field of Search .................. 385/3, 8, 16, 42–45, 385/123–130, 144–146

(56) References Cited

U.S. PATENT DOCUMENTS

| | | | |
|---|---|---|---|
| 4,756,599 | * 7/1988 | Maeda et al. | 385/145 |
| 4,775,215 | * 10/1988 | Teng et al. | 385/144 |
| 4,887,884 | * 12/1989 | Hayden | 385/42 |
| 4,979,796 | * 12/1990 | Cardarelli et al. | 385/144 |
| 5,062,680 | * 11/1991 | Imamura et al. | 385/145 |
| 5,182,783 | * 1/1993 | Bosc et al. | 385/123 |
| 5,402,514 | * 3/1995 | Booth et al. | 385/130 |
| 5,533,151 | * 7/1996 | Leonard | 385/145 |
| 5,703,975 | * 12/1997 | Miller et al. | 385/16 |
| 6,002,823 | * 12/1999 | Chandross et al. | 385/50 |

* cited by examiner

*Primary Examiner*—Thong Nguyen
(74) *Attorney, Agent, or Firm*—Thomas, Kayden, Horstemeyer & Risley, L.L.P.

(57) ABSTRACT

A Mach-Zender interferometer employing a section of polymer cladding in one branch. The polymer cladding has an index of refraction that varies with temperature. The temperature of the section of polymer cladding is adjusted to cause a corresponding change in the phase of the laser light flowing through the waveguide core bounded by the polymer cladding to effect a desired switching or modulation of the laser light.

7 Claims, 4 Drawing Sheets

POLYMER MATERIAL AND METHOD FOR OPTICAL SWITCHING AND MODULATION

FIELD OF THE INVENTION

The present invention relates to the field of optical waveguides and, more particularly, to the materials used to construct optical waveguides.

BACKGROUND OF THE INVENTION

Current communications networks throughout the world have embraced the use of optical fiber waveguide technology to provide a conduit of transmission components for voice, video, and data signals. Optical networks offer far greater bandwidth and reliability than do conventional electronic networks. As a consequence, current research efforts have been directed to expanding the capabilities of optical waveguide technology at reduced cost to aid in the acceleration of the conversion of the present electrical communications networks to optical communications networks.

These optical communications networks are comprised of many different components. These include optical fiber cable, switches, attenuators, couplers, and many more such devices. Typically, these devices are comprised of a core surrounded by a cladding material. Both the materials used for the core and the cladding include silica or doped silica as well as many other similar materials. These materials are employed because they have a desirable index of refraction as well as other properties which facilitate their use.

Often times it is desirable to create specific effects on the propagation of the optical signal transmitted through these devices. For example, one such effect is to either modulate an optical signal or switch an optical signal from one waveguide to another. Consequently, there is a need for new optical structures which will facilitate the switching and modulation of an optical signal in an optical waveguide.

SUMMARY OF THE INVENTION

The present invention entails a Mach-Zender interferometer with a first waveguide core and a second waveguide core. The first and second waveguide cores are brought close together at a first directional coupler and a second directional coupler. The first waveguide core is surrounded by a first cladding and the second waveguide core is surrounded by a second cladding. The first cladding includes a section of polymer cladding in contact with the first waveguide core between the first and second directional couplers. Outside the polymer cladding section, the first waveguide core is surrounded by a standard cladding material which may include a substrate upon which the first waveguide core is formed and a silica cladding material covering the remaining surface area of the first waveguide core. The second waveguide core is similar to the first waveguide core except a standard cladding material is employed throughout its length. The polymer cladding has an index of refraction that varies with temperature.

A laser light which is transmitted into an input port may be transferred from the first waveguide core to the second waveguide core and vice versa in an identified proportion by altering the phase in one of the waveguides between the directional couplers. This is accomplished by altering the temperature of the polymer cladding resulting in a change in the index of refraction. Depending on the length of the section of polymer cladding, the phase of the laser light in the waveguide core bounded by the polymer cladding is altered by the desired amount.

The present invention may also be viewed as a method for switching laser radiation in an optical circuit comprising the steps of optically coupling a first waveguide core and a second waveguide core with a first directional coupler and a second directional coupler forming first and second joints, and then covering the first waveguide core with a first cladding that includes an identifiable area of a polymer cladding material, the identifiable area being between the first and second joints. Next the second waveguide core is covered with a second cladding and a laser beam is transmitted into the first waveguide core. Thereafter, further steps include splitting the laser beam in the first directional coupler at the first joint into a first split beam directed to the first waveguide core and a second split beam directed to the second waveguide core, and then controlling the temperature of the polymer cladding, thereby changing the index of refraction of the polymer cladding resulting in a change in the phase of the first split beam. Finally, the first and second split beams are recombined in the second directional coupler at the second joint, and the laser beam is transmitted out of the first and second waveguide cores according to a power ratio based upon the degree of the phase change of the first split beam.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
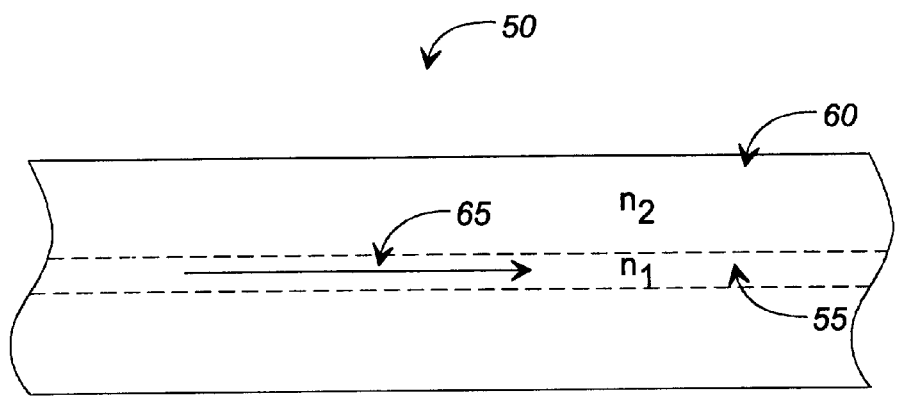
FIG. 1 is a drawing showing a side view of a conventional optical fiber.

Turning to FIG. 1, shown is a waveguide which comprises a conventional optical fiber 50. The optical fiber 50 comprises a core 55 surrounded by a cladding 60. The core is comprised of a material with an index of refraction of $n_1$. The cladding 60 is comprised of a material with an index of refraction of $n_2$. The optical fiber 50 operates as a waveguide for light radiation 65 when $n_1$ is greater than $n_2$ as is known by those skilled in the art. When $n_1$ is less than or equal to $n_2$, the light radiation 65 leaves the core 55 and will not propagate along the core 55.

Figure 2:
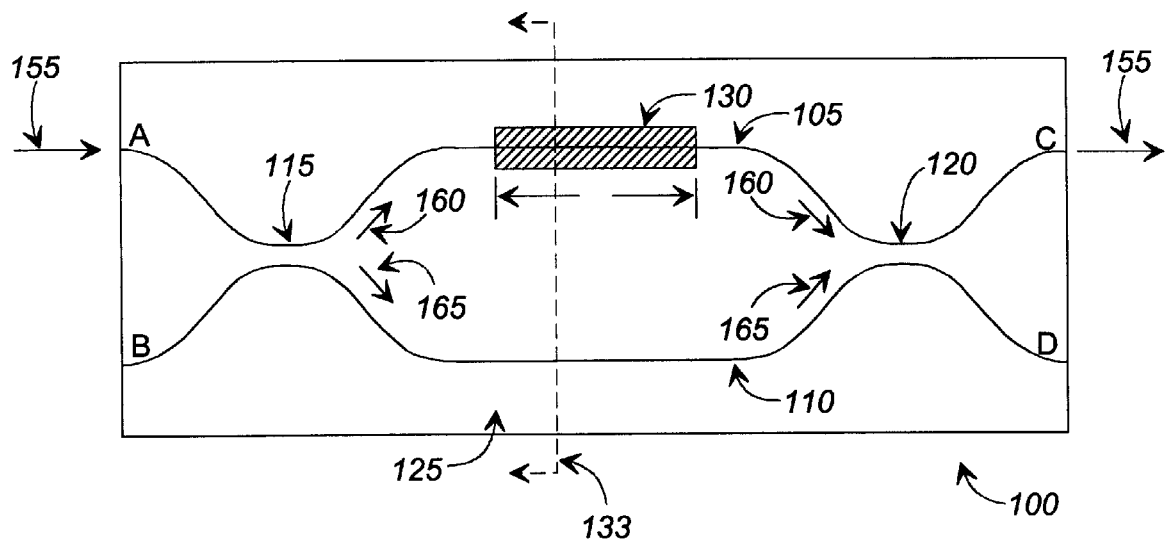
FIG. 2 is a drawing showing a Mach-Zender interferometer according to an embodiment of the present invention.

With these concepts in mind, reference is made to FIG. 2 which shows a Mach-Zender interferometer 100 according an embodiment of the present invention. The Mach-Zender interferometer 100 comprises a first waveguide core 105 and a second waveguide core 110 essentially in parallel. The first and second waveguide cores 105 and 110 approach each other at two points forming a first 3 dB directional coupler 115 and a second 3 dB directional coupler 120. The first and second waveguide cores 105 and 110 are the same length between the first and second 3 dB directional couplers 115 and 120. The first waveguide core 105 has an input port A and an output port C. The second waveguide core 110 has an input port B and an output port D.

Both the first and second waveguide cores 105 and 110 are formed on a substrate. The remaining surface area of the first waveguide core 105 not bounded by the substrate is encased in a cladding which comprises both a standard cladding 125 and a section of polymer cladding 130. The section of polymer cladding 130 covers the first waveguide core 105 for an identifiable length L and is positioned between the first and second 3 dB directional couplers 115 and 120. The remaining surface area of the second waveguide core 110 not in contact with the substrate is encased by the standard cladding 125. Note that the substrate and the standard cladding 125 have similar properties and together can be considered a single cladding material for purposes of the operation of the Mach-Zender interferometer 100. Also, the Mach-Zender interferometer 100 is accomplished preferably on a planar waveguide optical circuit which are well known by those skilled in the art and not discussed here in detail. A cutaway line 133 is drawn across the middle of the Mach-Zender interferometer 100.

The polymer cladding 130 is taken from the general category of materials classified as polymers which generally are chemical compounds with high molecular weight comprising a number of structural units linked together by covalent bonds. Polymers which qualify for use as the polymer cladding 130 should generally possess the optical characteristics including an index of refraction that varies with temperature as will be discussed.

Figure 3:
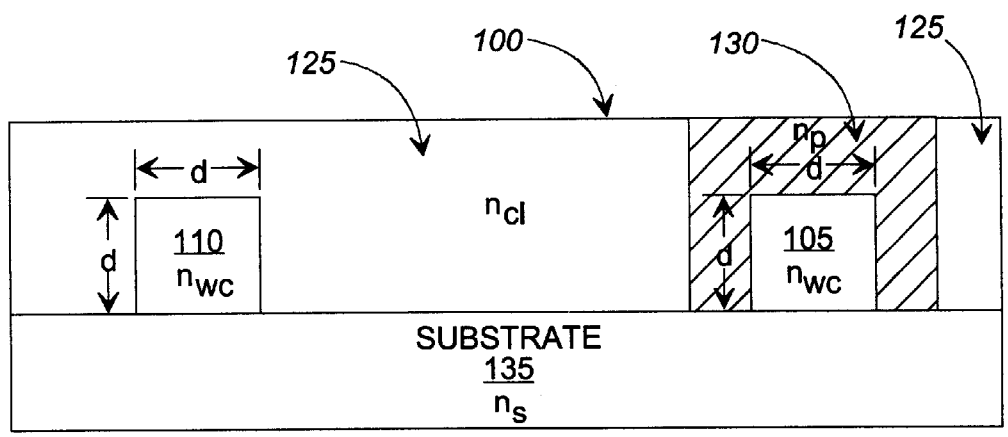
FIG. 3 is a drawing showing a sectional view of the Mach-Zender interferometer of FIG. 2 taken along the cutaway line in FIG. 2.

Turning to FIG. 3, shown is a sectional view taken along the cutaway line 133 (FIG. 2) of the Mach-Zender interferometer 100. The first and second waveguide cores 105 and 110 are square in shape having sides of dimension d. The bottom side of the first and second waveguide cores 105 and 110 contact a substrate 135 which has an index of refraction $n_S$. The remaining sides of the second waveguide core 110 are in contact with the standard cladding 125. The remaining sides of the first waveguide core 105 are in contact with the polymer cladding 130 as shown, although the remaining sides of the first waveguide core 105 beyond the length L of the polymer cladding 130 are in contact with the standard cladding 125. The first and second waveguide cores 105 and 110 have an index of refraction $n_{WC}$. The standard cladding 125 has an index of refraction $n_{CL}$, and the polymer cladding 130 has an index of refraction $n_P$.

Note that the polymer cladding 130 features a relatively high thermo-optic coefficient $$\frac{\partial n_P}{\partial T}$$

due to the fact that the index of refraction of polymers can vary significantly with changing temperature. For example, the thermo-optic coefficient $$\frac{\partial n_P}{\partial T}$$

generally may be as high as $-0.0001$ C.$^{-1}$ and even up to $-0.0003$ C.$^{-1}$, where $n_P$ is the refractive index of the polymer and T is temperature. In contrast, the thermo-optic coefficient of silica, for example, is much lower, being on the order of 0.00001 C.$^{-1}$. Consequently, the index of refraction of fused silica and other similar materials do not change significantly when subjected to heat, while the index of refraction of the polymers do change significantly. In addition, according to the preferred embodiment, the core 105 comprises doped silica and the substrate 135 comprises silica. However, it is understood by those skilled in the art that other materials may be employed. Consequently, an exhaustive list of possible materials used to create these components is not offered herein.

Figure 4:
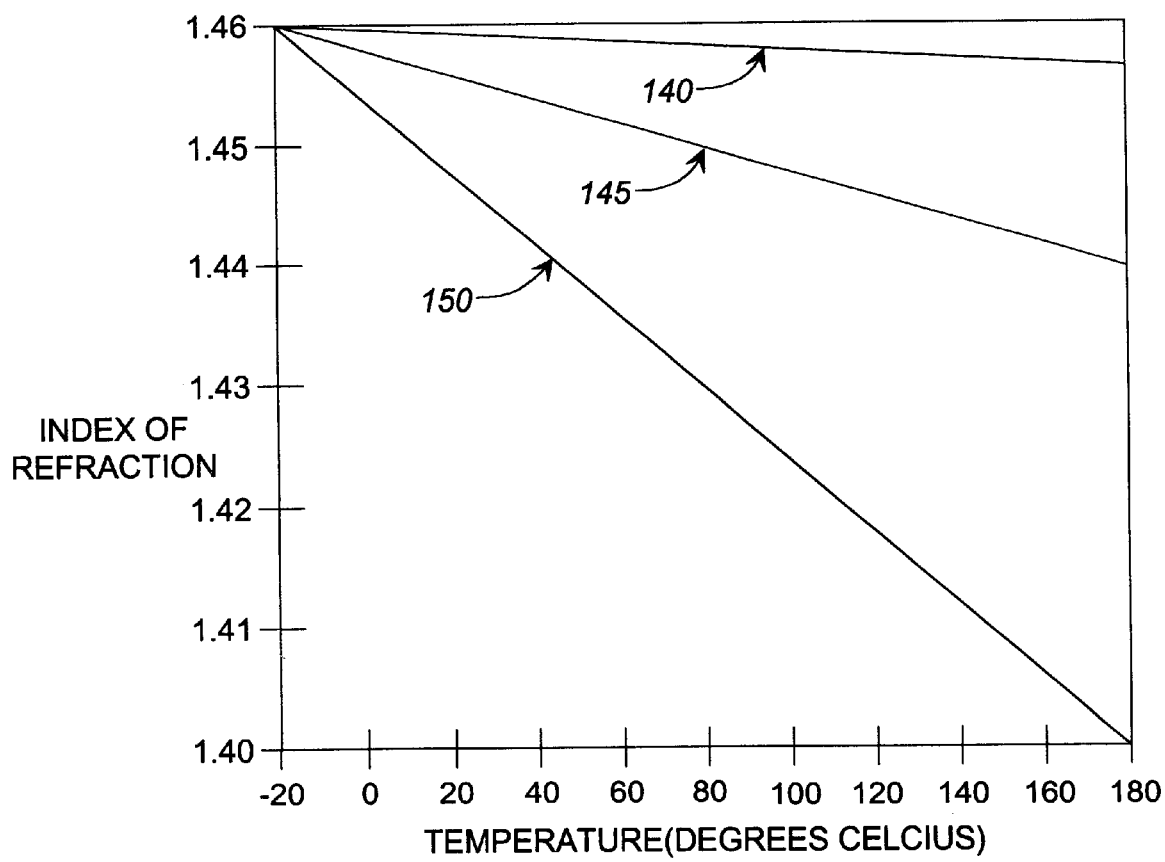
FIG. 4 is a graph showing the index of refraction of selected polymers used in the Mach-Zender interferometer of FIG. 2 as a function of temperature.

Referring to FIG. 4, shown is a graph depicting the index of refraction as a function of temperature in degrees Celsius of three example polymers which may be used for the polymer cladding 130 (FIG. 2). Line 140 depicts the index of refraction of F/CA polymer which has a thermal coefficient of $-0.00002$ C.$^{-1}$, line 145 depicts the index of refraction of D-PMMA/D-FA polymer which has a thermal coefficient of $-0.0001$ C.$^{-1}$, and line 150 depicts the index of refraction of FA polymer which has a thermal coefficient of $-0.0003$ C.$^{-1}$. Note that the starting point at n=1.46 and Temperature=$-20°$ C. were chosen arbitrarily. Ultimately, the indexes of refraction of various polymers depend upon their composition and can vary over a relatively wide range as a function of temperature.

Turning back to FIG. 2, the operation of the Mach-Zender interferometer 100 is explained. A light beam 155 enters the first waveguide core 105 at input port A and is directed to the first 3 dB directional coupler 115. Note that the light beam 155 might enter the second waveguide core 110 at input port B rather than only the first waveguide core 105 at input port A. The light beam 155 is depicted as entering the first waveguide core 105 at input port A for the purposes of illustration herein.

Upon encountering the first 3 dB directional coupler 115, half of the light beam 155 is transferred to the second waveguide core 110, resulting in a first split light beam 160 transmitted through the first waveguide core 105 and a second split light beam 165 transmitted through the second waveguide core 110. At this point, the second split light beam 165 trails the first split light beam 160, the first and second split light beams 160 and 165 being 90° out of phase. Given that the first and second waveguides 105 and 110 are the same length between the first and second 3 dB directional couplers 115 and 120, the second split light beam 165 is transferred back into the first waveguide core 105 by the second 3 dB directional coupler 120 and the light beam 155 emerges from the output port C as shown in FIG. 2. However, if the phase of the first split light beam 160 transmitted through the first waveguide core 105 is shifted by 180°, then the light beam 155 emerges from port D. Thus, the Mach-Zender interferometer 100 can be made to act as a switch, where the phase of one of the split light beams 160 or 165 can be shifted appropriately. The first and second 3 dB directional couplers 115 and 120 can also be replaced by directional couplers which will result in a particular proportion of light transmitted out of both output ports C and D, depending on the degree of the phase shift.

The phase of a light beam can be shifted by altering the propagation constant $\beta$ of the waveguide through which the light beam travels. According to an embodiments of the present invention, in the case of the Mach-Zender interferometer 100, the propagation constant $\beta$ of the first waveguide core 105 is altered by changing the index of refraction of the polymer cladding 130. Thus, in order to switch the light beam 155 from exiting the first waveguide core 105 at output port C to exiting the second waveguide core 110 at output port D, a change in the propagation constant $\Delta\beta$ is made to occur. Given the length L of the polymer cladding 130, then the relationship between the change in the propagation constant can be written as $\Delta\beta L = \pi$. Accordingly, the length L required for switching is $L = \pi/\Delta\beta$.

Figure 5:
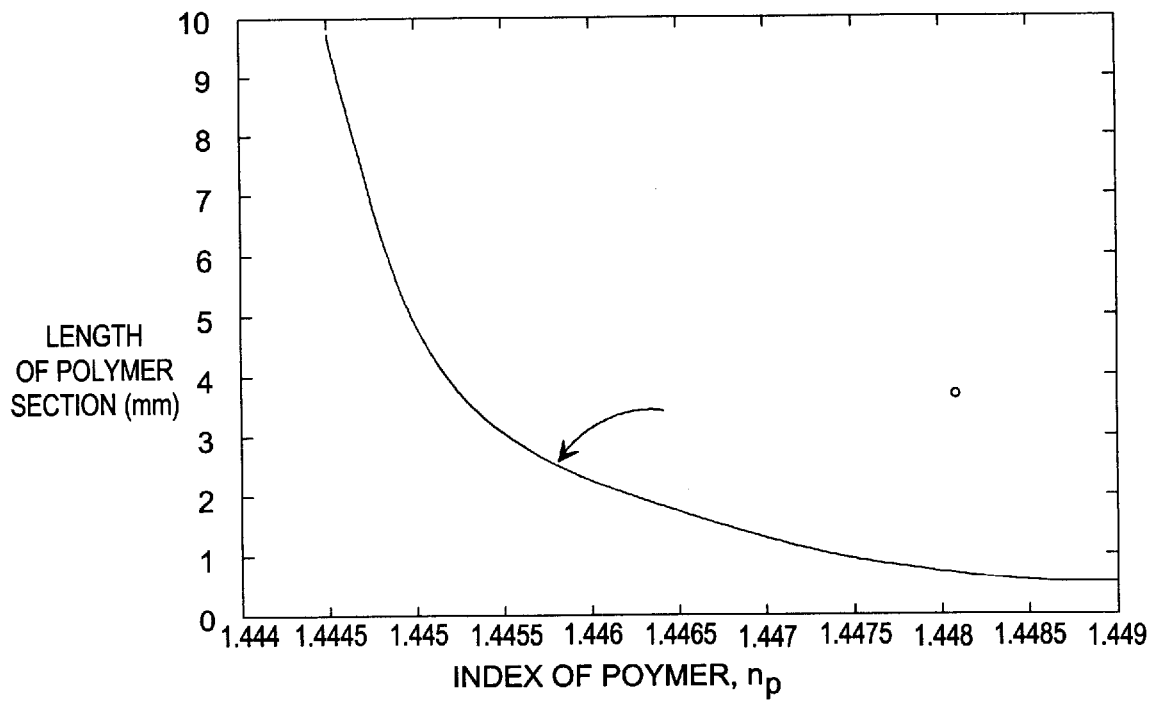
FIG. 5 is a graph showing the length of the polymer section in the Mach-Zender interferometer of FIG. 2 as a function of the index of refraction of the polymer material for a phase change of 180°.

Referring then, to FIG. 5, shown is a graph which depicts the length L of the polymer cladding 130 (FIG. 2) as a function of the index of refraction $n_P$ of the polymer cladding 130 that results in a phase shift of 180°. The index of refraction $n_P$ of the polymer cladding 130 is determined by altering its temperature accordingly. The graph is generated where the frequency of the light wave $\lambda = 1.55$ $\mu$m, the index of refraction $n_{WC} = 1.45276$, and the index of refraction $n_S = 1.4441$. According to the graph, the phase changes by 180° when the index of refraction $n_p$ of the polymer cladding 130 rises from $n_p = 1.4441$, the value of the index of refraction $n_s$ of the substrate 135 (FIG. 3A), to the value indicated on the x-axis of the graph of FIG. 5, if the length of the polymer cladding 130 is equal to the length indicated on the vertical y-axis. The graph of FIG. 5 assumes the structure of the Mach-Zender interferometer 100 (FIG. 2) which includes the square waveguide core 105 with sides of dimension d=6 $\mu$m being bounded by the substrate 135 (FIG. 3) on one side and the polymer cladding 130 (FIG. 3) on the remaining three sides as shown in FIG. 3. Note it would be possible to employ other physical structures as well and compute a similar graph to that shown in FIG. 5. In the case where the Mach-Zender interferometer 100 (FIG. 2) is used as an optical switch, the temperature of the polymer cladding 130 should be stable within 10% of the value to keep any leakage at below 1% out of whichever output port C or D is switched off.

Figure 6:
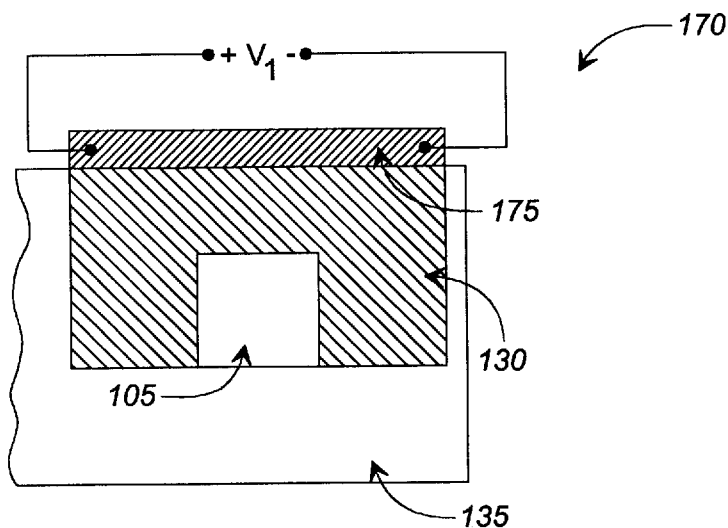
FIG. 6 is a drawing showing a partial sectional view of the Mach-Zinder interferometer of FIG. 2, further including a thermoelectric heater.

Turning to FIG. 6, shown is a partial sectional view 170 of the waveguide core 105 surrounded by the polymer cladding 130 and the substrate 135. Disposed adjacent to the polymer cladding 130 is a thermo-electric heater 175 which is electrically coupled to a voltage source $V_1$. The temperature of the polymer cladding 130 is raised by raising the temperature of the thermo-electric heater 175 by application of voltage source $V_1$ appropriately. To lower the temperature of the polymer cladding, heat is allowed to dissipate from the Mach-Zender interferometer 100 (FIG. 2), or a thermo-electric cooler may be employed.

Figure 7:
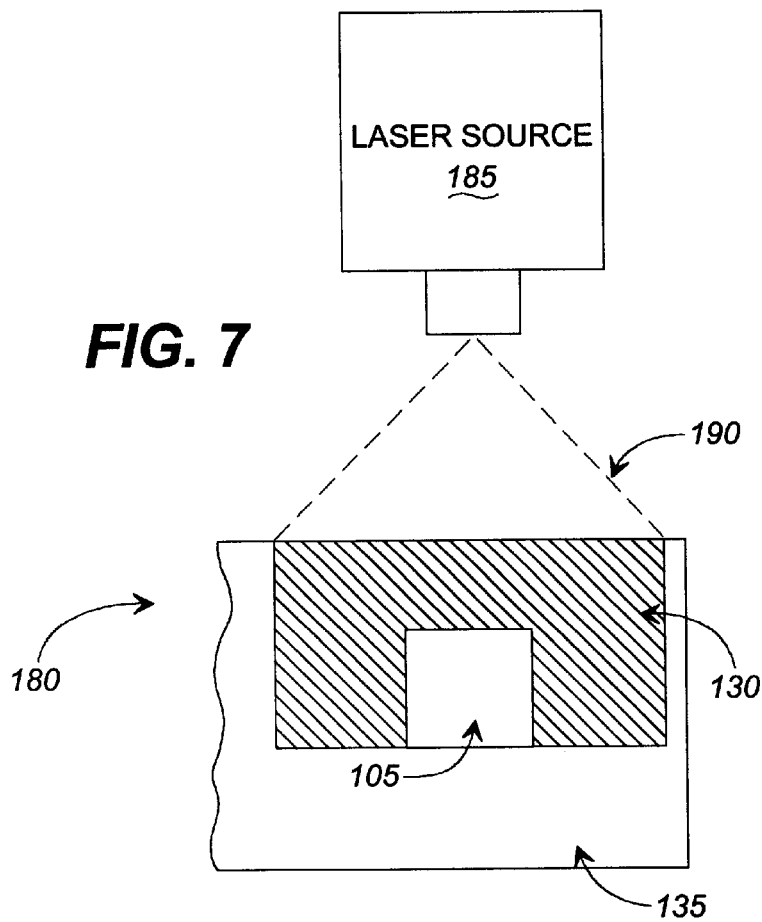
FIG. 7 is a drawing showing a partial sectional view of the Mach-Zinder interferometer of FIG. 2, further including a laser employed as a heating device.

Referring then, to FIG. 7, shown is a partial sectional view 180 of the waveguide core 105 surrounded by the polymer cladding 130 and the substrate 135. Also shown is a laser source 185 which is positioned to project laser radiation 190 onto the polymer cladding 130. When applied, the laser radiation 190 causes the temperature of the polymer cladding 130 to rise. To lower the temperature of the polymer cladding, heat is allowed to dissipate from the Mach-Zender interferometer 100 (FIG. 2), or a thermo-electric cooler may be employed as was the case with the thermo-electric heater 175 (FIG. 6).

Figure 8:
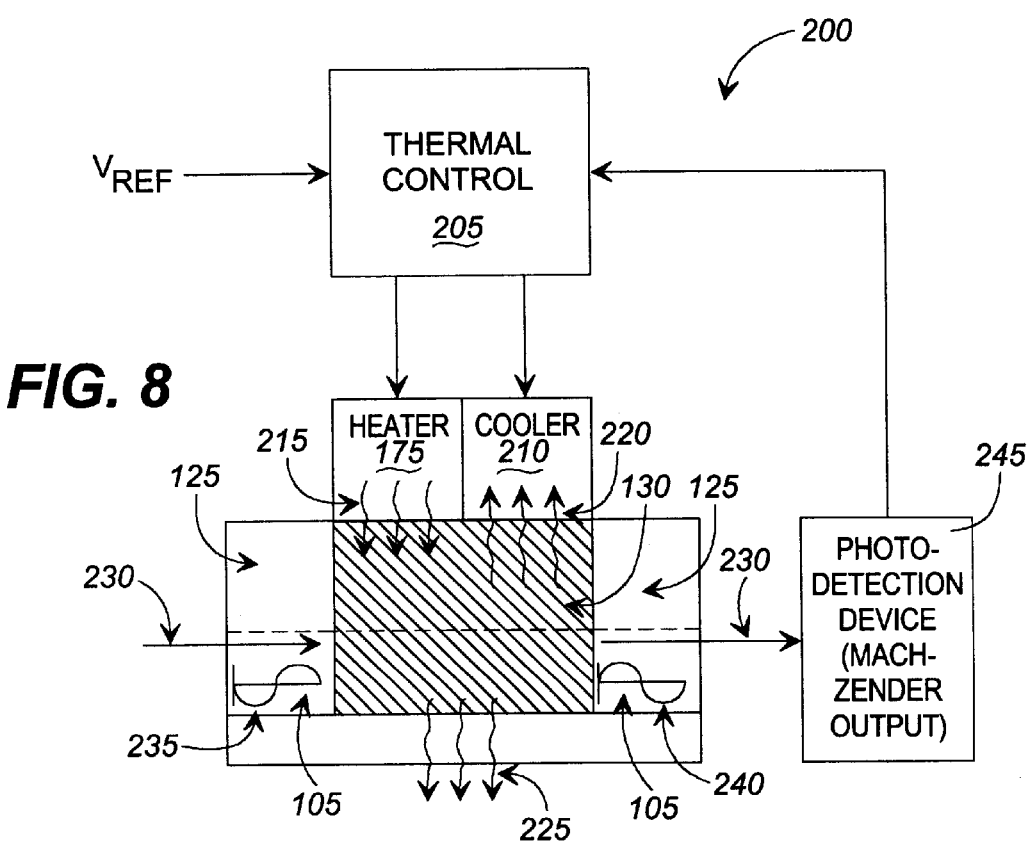
FIG. 8 is a temperature control system according to an embodiment of the invention, including a feedback loop to control the temperature of the polymer cladding of FIG. 2.

Finally, reference is made to FIG. 8 which shows a temperature control system 200 to control the temperature of the polymer cladding 130. The temperature control system 200 includes a thermal control 205 which is employed in a feedback loop. A reference voltage $V_{REF}$ is input into the thermal control 205 which indicates the desired phase shift such as 180° for a switching action in the Mach-Zender interferometer 100 (FIG. 2) as discussed previously. The thermal control 205 is electrically coupled to both a thermo-electric heater 175 and a thermo-electric cooler 210. The thermo-electric heater 175 and a thermo-electric cooler 210 are positioned, for example, adjacent to the polymer cladding 130 to facilitate heat transfer to and from the polymer cladding. The polymer cladding 130 covers the waveguide core 105 as described previously. The temperature of the polymer cladding 130 is raised by causing the thermo-electric heater 175 to add heat 215. The temperature of polymer cladding 130 is cooled by activating the thermo-electric cooler 210 thereby drawing heat 220 out of the polymer cladding 103, and by taking into account the natural heat loss 225 of the Mach-Zender interferometer 100 to the surrounding atmosphere. Laser light 230 is directed through the waveguide core 105, which is surrounded by the polymer cladding 130. Before encountering the polymer cladding 130, the laser light 230 is at an initial phase 235 and leaves the polymer cladding 130 with a shifted phase 240. The laser light 230 is ultimately routed out of the Mach-Zender interferometer 100 out of output ports C and/or D. The laser light output can be measured by a photo-detection device 245 and, accordingly, it can be determined whether the appropriate phase change has occurred due to the change in temperature of the polymer cladding 130 as discussed previously. The thermal control 205 receives a feedback signal which relays the phase information and generates an appropriate signal to the thermo-electric heater 175 or the thermo-electric cooler 210.

Many variations and modifications may be made to the various embodiments of the invention without departing substantially from the spirit and principles of the invention. All such modifications and variations are intended to be included herein within the scope of the present invention, as defined by the following claims.

Having thus described the invention, it is claimed:

1. An optical circuit, comprising:

a substrate;

a first waveguide core disposed upon the substrate and surrounded by a first cladding on all sides not in contact with the substrate, having a phase of laser radiation propagating through the first waveguide core;

a second waveguide core disposed upon the substrate and surrounded by a second cladding on all sides not in contact with the substrate;

a first directional coupler optically coupling the first waveguide core and the second waveguide core at a first junction;

a second directional coupler optically coupling the first waveguide core and the second waveguide core at a second junction; and a section of a thermo-optic polymer cladding material included in the first cladding, the therno-optic polymer cladding material covering an identifiable area of the first waveguide core between the first and second junction, the thermo-optic polymer cladding material having an index of refraction which varies with temperature, thereby changing the phase of laser radiation propagating through the first waveguide core.

2. The optical circuit of claim 1, further comprising a heater adjacent to the section of the polymer cladding material.

3. The waveguide of claim 1, further comprising a thermo-electric cooler adjacent to the section of the polymer cladding material.

4. The waveguide of claim 1, further comprising a laser positioned to focus laser radiation onto the section of the polymer cladding material, thereby resulting in heating of the polymer cladding material.

5. The waveguide of claim 1, further comprising a means for raising and lowering the temperature of the polymer cladding material.

6. The waveguide of claim 1, further comprising a feedback loop control for raising and lowering the temperature of the polymer cladding material.

7. A method for switching laser radiation in an optical circuit, comprising the steps of:

placing first waveguide core and a second waveguide core upon a substrate;

optically coupling a first waveguide core and a second waveguide core with a first directional coupler forming a first joint;

optically coupling the first waveguide core and the second waveguide core with a second directional coupler forming a second joint;

covering the first waveguide core on all sides not touching the substrate with a first cladding that includes an identifiable area of a thermo-optic polymer cladding material having a temperature and an index of refraction, the identifiable area being between the first and second joints;

covering the second waveguide core with a second cladding;

transmitting a laser beam with a phase into the first waveguide core;

splitting the laser beam in the first directional coupler at the first joint into a first split beam directed to the first waveguide core and a second split beam directed to the second waveguide core;

controlling the temperature of the thermo-optic polymer cladding material, the index of refraction of the thermo-optic polymer cladding material varying with the temperature, thereby changing the phase of the first split beam by a certain degree;

recombining the first and second split beams in the second directional coupler at the second joint; and transmitting the laser beam out of the first and second waveguide cores according to a power ratio based upon the degree of the phase change of the first split beam.

* * * * *